US010808649B2

(12) United States Patent
Villarreal et al.

(10) Patent No.: US 10,808,649 B2
(45) Date of Patent: Oct. 20, 2020

(54) MICROWAVE IGNITION OF ELECTRICALLY OPERATED PROPELLANTS

(71) Applicant: Raytheon Company, Waltham, MA (US)

(72) Inventors: James K. Villarreal, Tucson, AZ (US); Jeremy C. Danforth, Tucson, AZ (US); Matt H. Summers, Marana, AZ (US); Daniel K. Johnson, Glendora, CA (US); Mark T. Langhenry, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1099 days.

(21) Appl. No.: 15/240,932

(22) Filed: Aug. 18, 2016

(65) Prior Publication Data

US 2018/0051657 A1    Feb. 22, 2018

(51) Int. Cl.
*F02K 9/95*    (2006.01)
*F02K 9/94*    (2006.01)
(Continued)

(52) U.S. Cl.
CPC .............. *F02K 9/95* (2013.01); *C06B 23/00* (2013.01); *C06B 27/00* (2013.01); *C06B 29/00* (2013.01);
(Continued)

(58) Field of Classification Search
CPC .......... F02K 9/95; F02K 9/94; F02K 9/08–28; F42B 3/10; F42B 5/08; F41A 19/63; F03H 1/0087
See application file for complete search history.

(56) References Cited

U.S. PATENT DOCUMENTS

| 3,636,709 | A | * | 1/1972 | La Rocca | F02K 9/94 60/203.1 |
| 6,152,039 | A | * | 11/2000 | Lee | F02K 9/95 102/200 |

(Continued)

FOREIGN PATENT DOCUMENTS

| DE | 60011959 T2 | 8/2005 |
| WO | 93/05356 A1 | 3/1993 |

OTHER PUBLICATIONS

Sun Review on Microwave-Matter Interaction Fundamentals and Efficient Microwave (Year: 2016).*
(Continued)

*Primary Examiner* — Scott J Walthour
*Assistant Examiner* — William L Breazeal
(74) *Attorney, Agent, or Firm* — Schwegman Lundberg & Woessner, P.A.

(57) ABSTRACT

Microwave energy is used to ignite and control the ignition of electrically operated propellant to produce high-pressure gas. The propellant includes conductive particles that act as a free source of electrons. Incoming microwave energy accumulates electric charge in an attenuation zone, which is discharged in the form of dielectric breakdowns to create local randomly oriented currents. The propellant also includes polar molecules. The polar molecules in the attenuation zone absorb microwave energy causing the molecules to rapidly vibrate thereby increasing the temperature of the propellant. The increase in temperature and the local current densities together establish an ignition condition to ignite and sustain ignition of an ignition surface of the attenuation zone as the zone regresses without igniting the remaining bulk of the propellant.

14 Claims, 9 Drawing Sheets

(51) Int. Cl.
    *C06B 45/10*     (2006.01)
    *C06B 23/00*     (2006.01)
    *C06B 27/00*     (2006.01)
    *C06B 29/00*     (2006.01)
    *F02K 9/08*     (2006.01)

(52) U.S. Cl.
    CPC ................ *C06B 45/10* (2013.01); *F02K 9/08* (2013.01); *F02K 9/94* (2013.01)

(56) References Cited

U.S. PATENT DOCUMENTS

| | | |
|---|---|---|
| 7,108,758 B1 | 9/2006 | Fallis et al. |
| 7,506,500 B1 | 3/2009 | Krishnan |
| 8,857,338 B2 | 10/2014 | Sawka et al. |
| 8,950,329 B2 * | 2/2015 | Villarreal ................... F02K 9/94 102/202 |
| 2006/0011083 A1 | 1/2006 | Perry et al. |
| 2014/0174313 A1 | 6/2014 | Villarreal et al. |

OTHER PUBLICATIONS

Cohen "Advanced Binders for Solid Propellants—a Review" (Year: 1966).*

Curling et al., "Progress Towards Microwave Ignition of Explosives," AIP Conference Proceedings, Dec. 31, 2009, pp. 486-489.

* cited by examiner

MICROWAVE IGNITION OF ELECTRICALLY OPERATED PROPELLANTS

BACKGROUND OF THE INVENTION

Field of the Invention

This invention relates to electrically operated propellant and more particularly to techniques for ignition, control and extinguishment of electrically operated propellants.

Description of the Related Art

All solid propellants are a combination of oxidizer, fuel, binder and additives. The oxidizer provides oxygen required to burn the fuel. The binder provides a structural material to bind the fuel and oxidizer. The binder itself is a fuel. Additional fuel may or may not be required. Additives may be used for a variety of purposes including to assist mixing of the propellant, to control the burn rate, etc. For example, additives containing polar molecules such as $H_2O$, glycerol, dimethul sulfoxide (DMSO), n-butanol, ethanolamine and 2-ethoxyethanol are used to mix the propellant. These polar molecules are substantially removed during the baking process leaving only a trace amount in the final propellant. Propellant may be used for gas generators, rocket motors, air bags and the like. It is desirable that substantially all of the propellant is or can be consumed.

Solid rocket motor (SRM) propellants are ignited thermally and burn vigorously to completion of the propellant. SRM propellants typically exhibit a designed burn rate and consume substantially all of the propellant. The burn rate may be controlled through complicated valve systems referred to as a "pintle". Furthermore, once ignited, SRM propellants cannot be "turned off" except by a violent and uncontrolled depressurization. The most common oxidizer for SRM propellants is a solid ammonium perchlorate (AP). The resulting SRM propellant ignites in response to heat but is electrically inert.

SRM propellants are typically initiated using a secondary pyrotechnic such as a 1.4 level explosive. This explosive is ignited via a bridgewire that heats up and transfers heat energy to the energetic material. This very sensitive energetic material then ignites the primary SRM propellant. Another proposed approach is to use a laser to supply photon energy in the visible band from approximately 430-770 THz to directly heat the primary SRM propellant unit it reaches its ignition point.

Electrically operated propellants are ignited by application of heat and an electric input. In a simple configuration, a voltage is applied between parallel wires embedded in the propellant. This produces ohmic heating of the propellant that raises the temperature of the propellant to above a thermal ignition threshold. Application of the voltage across the propellant creates a current density (J)=current (I)/area (A) of the propellant. The current density J must exceed an electrical ignition threshold of the propellant to ignite and burn. To support electrical operation, the oxidizer is "ionic" in the sense of providing free-flowing ions necessary for electrical control. The burn rate of the propellant may be controlled via the electric input.

Certain formulations of the propellant, and more specifically the oxidizer, allow combustion to be extinguished by interruption of the electric input as long as the chamber pressure remains less than a self-sustaining threshold pressure. The propellant may be reignited by reapplication of the electric input. Sawka's hydroxyl-ammonium nitrate (HAN) based propellant (U.S. Pat. No. 8,857,338) exhibits a threshold of about 150 psi. Villarreal's perchlorate-based propellant (U.S. Pat. No. 8,950,329) can be configured to exhibit a threshold greater than 200, 500, 1.500 and 2,000 psi. These higher threshold pressures allow for more practical applications in which the combustion may be turned on and off at elevated chamber pressures. For these reasons, electrically operated propellants are an attractive option to more mature SRM propellants.

A challenge to achieve wide spread use is to provide an electrode configuration that provides for control of the ignition surface and burn rate and efficient consumption of substantially all of the propellant, and one that is scalable to combust greater propellant mass to support larger gas generation systems. In various configurations, the propellant will only ignite at or very close to one of the electrodes and burn down the electrode. "Burn Back" as this is referred is an uncontrolled and inefficient process to ignite and consume propellant.

U.S. Pat. No. 8,857,338 "Electrode Ignition and Control of Electrically Ignitable Materials" also discloses an apparatus for providing electrically initiated and/or controlled combustion of electrically ignitable propellants is provided. In one example, the apparatus includes a volume of electrically ignitable propellant (solid and/or liquid), which is capable of self-sustaining combustion, and two (or more) electrodes operable to ignite the propellant. The apparatus may further include a power supply and controller in electrical communication with the electrodes for supplying a potential across the electrodes to initiate combustion of the propellant and/or control the rate of combustion of the propellant. For instance, by increasing or decreasing the power and current supplied through the propellant the rate of combustion may be varied.

Various configurations and geometries of the propellant, electrodes, and apparatus are described. In one example, the electrodes are in electrical contact with the electrically ignitable propellant and are supplied a direct current, which may cause combustion of the electrically ignitable propellant at the contact location of the positive electrode with the electrically ignitable propellant. In another example, the electrodes are supplied an alternating current, which may initiate nearly simultaneously combustion of the electrically ignitable propellant at the contact locations of the electrodes with the electrically ignitable propellant. In some examples, one or more of the electrodes may include an insulator material insulating a portion of the electrode from the electrically ignitable propellant (which may burn away with combustion of the propellant).

Figure 3A:
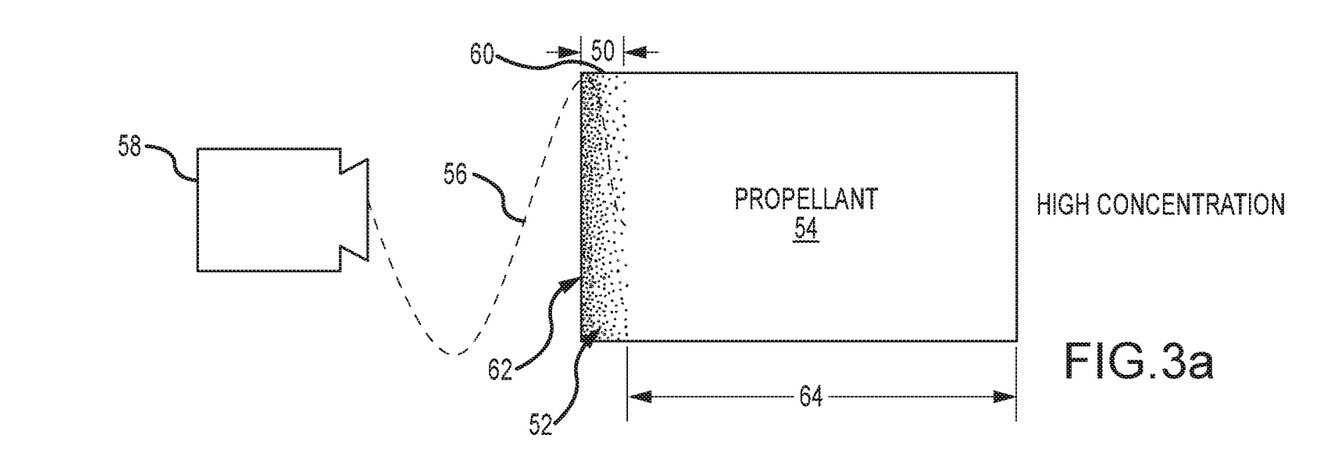
FIGS. 3a and 3b are illustrations of the gas generation system with varying depths of the attenuation zone in the electrically operated propellant based on the concentration of conductive particles.
Figure 3B:
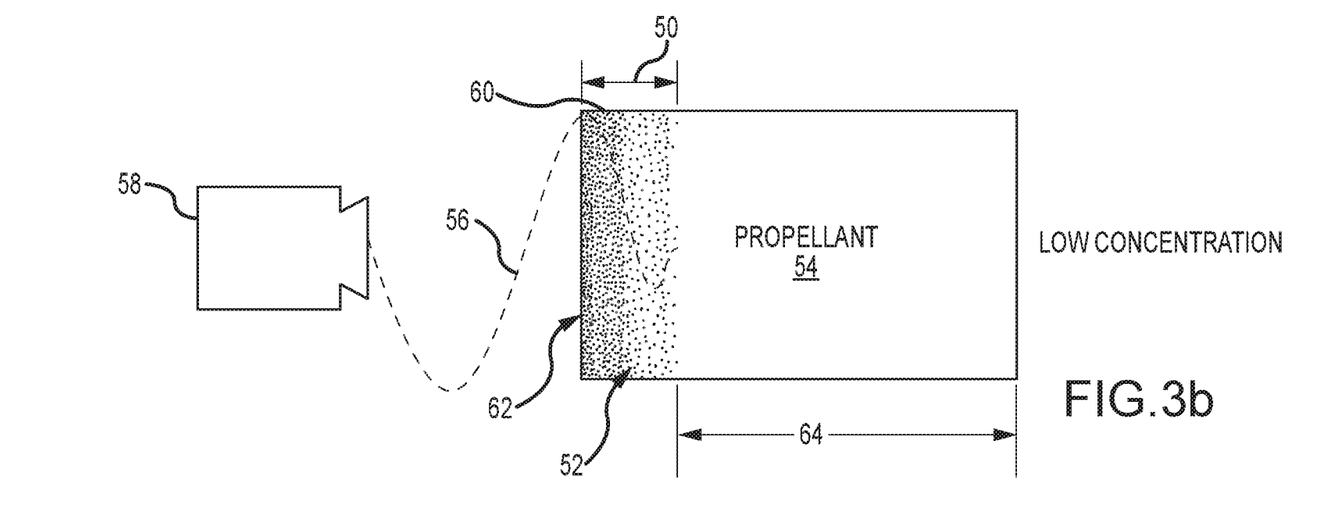

In one configuration, a center insulated wire electrode is positioned along the axis of a cylindrical electrode in a coaxial configuration around the propellant (FIGS. 1a-1b). As combustion of the propellant is initiated, the insulation burns away and the propellant regresses along the axis. In another configuration, parallel plate electrodes are positioned to either side of the propellant (FIGS. 3a-3b). In the FIG. 3a embodiment, one of the parallel plate electrodes is insulated to produce combustion of the propellant to spread across the gain-end to the outer cathode. The combustion of the propellant propagates to the left along the axis of the structure, in a generally uniform manner as illustrated. In contrast, in the FIG. 3b embodiment both of the plate electrodes are un-insulated. The propellant is broadly ignited along much of or the entire length of the positive electrode.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for microwave ignition of electrically operated propellant.

In an embodiment, a gas generation system includes an electrically operated propellant and a source configured to generate microwave radiation in a defined microwave band between 0.3 GHz and 300 GHz e.g., 5 GHz+/−5%. One or more additives include conductive particles (e.g., metals such as tungsten, magnesium, aluminum . . . or non-metals such as graphene or carbon nanotubes) suspended within the propellant that increase the conductivity of the propellant by acting as a free source of electrons. These metal additives may be the same or different than metal additives that may constitute the fuel for the propellant. One or more additives include polar molecules (e.g., $H_2O$, glycerol, dimethul sulfoxide (DMSO), n-butanol, ethanolamine or 2-ethoxyethanol) suspended within the propellant (which remain after baking).

In an ignition condition, incoming microwave energy creates an electric field E within an attenuation zone of the propellant that oscillates at the microwave frequency. The electric field E causes the free electrons to accumulate at conductive particles of high potential and be discharged in the form of dielectric breakdowns through the other constituents of the propellant to conductive particles of low potential. These discharges form randomly oriented local currents that exhibit local current densities J that exceed an electrical ignition threshold. The electric field E also causes the polar molecules to vibrate rapidly, which raises the temperature of the propellant above a thermal ignition threshold in the attenuation zone. In this ignition condition, an ignition surface of the attenuation zone ignites and burns as the zone regresses without igniting the remaining bulk of the propellant to generate gaseous byproducts that pressurize a combustion chamber.

In an embodiment, the microwave energy coupled into the propellant is split between vibrating the polar molecules ("dielectric heating") and the dielectric breakdowns within the attenuation zone. At least 5% of the coupled microwave energy is directed to dielectric heating and at least 5% to dielectric breakdown. More typically, 70-90% of the coupled microwave energy is directed to dielectric heating and 10-30% to dielectric breakdown. The balance may be affected by the selection and relative concentrations of the conductive particles and polar molecules as well as the microwave frequency.

In an embodiment, to efficiently couple microwave energy to the attenuation zone, an anti-node (peak of the oscillating wave) of the microwave energy is positioned at the ignition surface. In one embodiment, the phase of the microwave energy is modulated such that the anti-node tracks the position of the ignition surface as the attenuation zone regresses. In another embodiment, an actuator displaces the propellant to hold the ignition surface in place at the fixed anti-node of the microwave energy.

In an embodiment, the electrically operated propellant exhibits a self-sustaining threshold pressure at which the propellant once ignited cannot be extinguished and below which the propellant can be extinguished by interruption of an electrical input. This threshold may be as low as 150 psi and range up to 200, 500, 100, 1,500 and above 2,000 psi depending on the formulation of the propellant. In an extinguishment condition, combustion of the propellant is turned off by interrupting of the microwave energy as long as the chamber pressure has not exceeded this threshold.

In an embodiment, the electrically operated propellant includes an ionic oxidizer, a binder and a fuel plus the conductive additive and polar molecules. The ionic oxidizer, suitably a liquid when mixed, provides the free flowing ions necessary to achieve the elevated thresholds. For example, the oxidizer may be a liquid perchlorate based oxidizer. The propellants have demonstrated thresholds in excess of 2,000 psi. The fuel may comprise a metal fuel such as aluminum or magnesium selected for their IR emittance or heat absorbance properties. The metal additive may be for example gold or tungsten selected for their electrical properties to provide free electrons. A concentration of the polar molecules remains after the baking process.

In an embodiment, an electrically operated propellant for microwave ignition is formulated by adding polar molecules and conductive particles to a base composition of an oxidizer, fuel and binder, mixing the constituent elements and baking the propellant to leave some concentration of polar molecules in the cured electrically operated propellant. The concentration of polar molecules and conductive particles defining ignition mechanisms responsive to incoming microwave energy to generate both the dielectric heating and dielectric breakdowns to establish an ignition condition to ignite and sustain ignition of an ignition surface without igniting the remaining bulk of the propellant. The metal additive and polar molecule additive may each constitute between 5 and 40 percent of the mass of the propellant.

These and other features and advantages of the invention will be apparent to those skilled in the art from the following detailed description of preferred embodiments, taken together with the accompanying drawings, in which:

DETAILED DESCRIPTION OF THE INVENTION

The present invention provides for microwave ignition of electrically operated propellant. Microwave ignition overcomes the issue of "burn back" exhibited by various electrode configurations. Microwave ignition is scalable to combust greater propellant mass to support larger gas generation systems.

Figure 1:
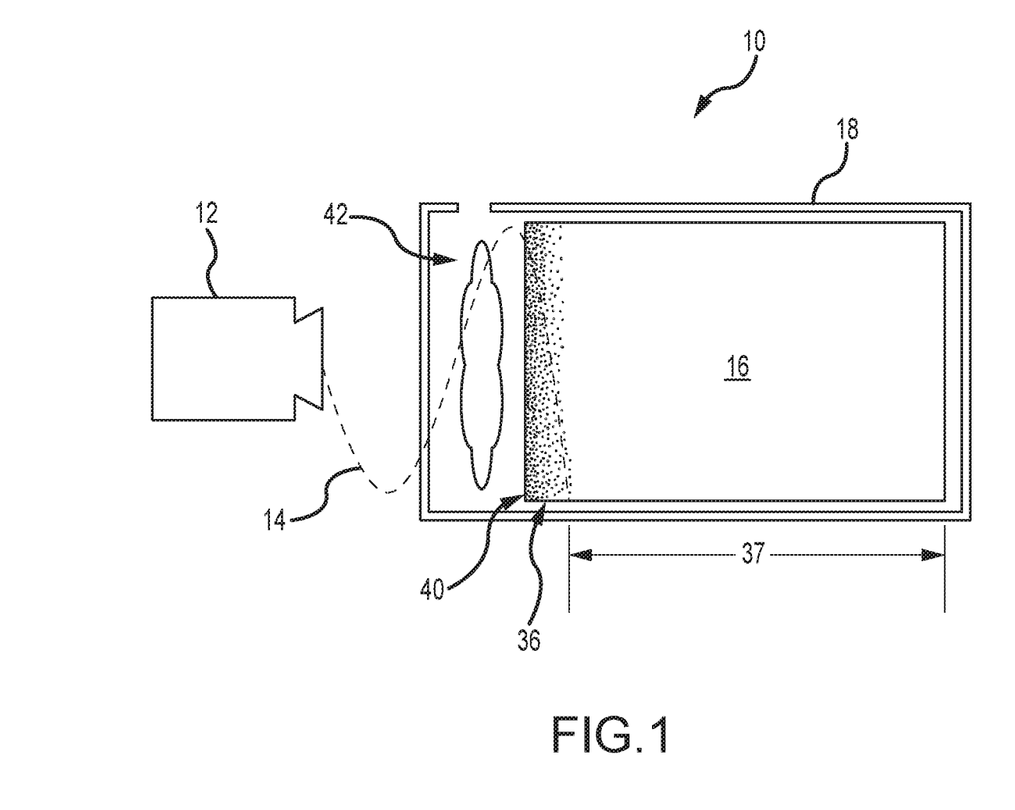
FIG. 1 is an illustration of a gas generation system using microwave ignition of an electrically operated propellant.
Figure 2A:
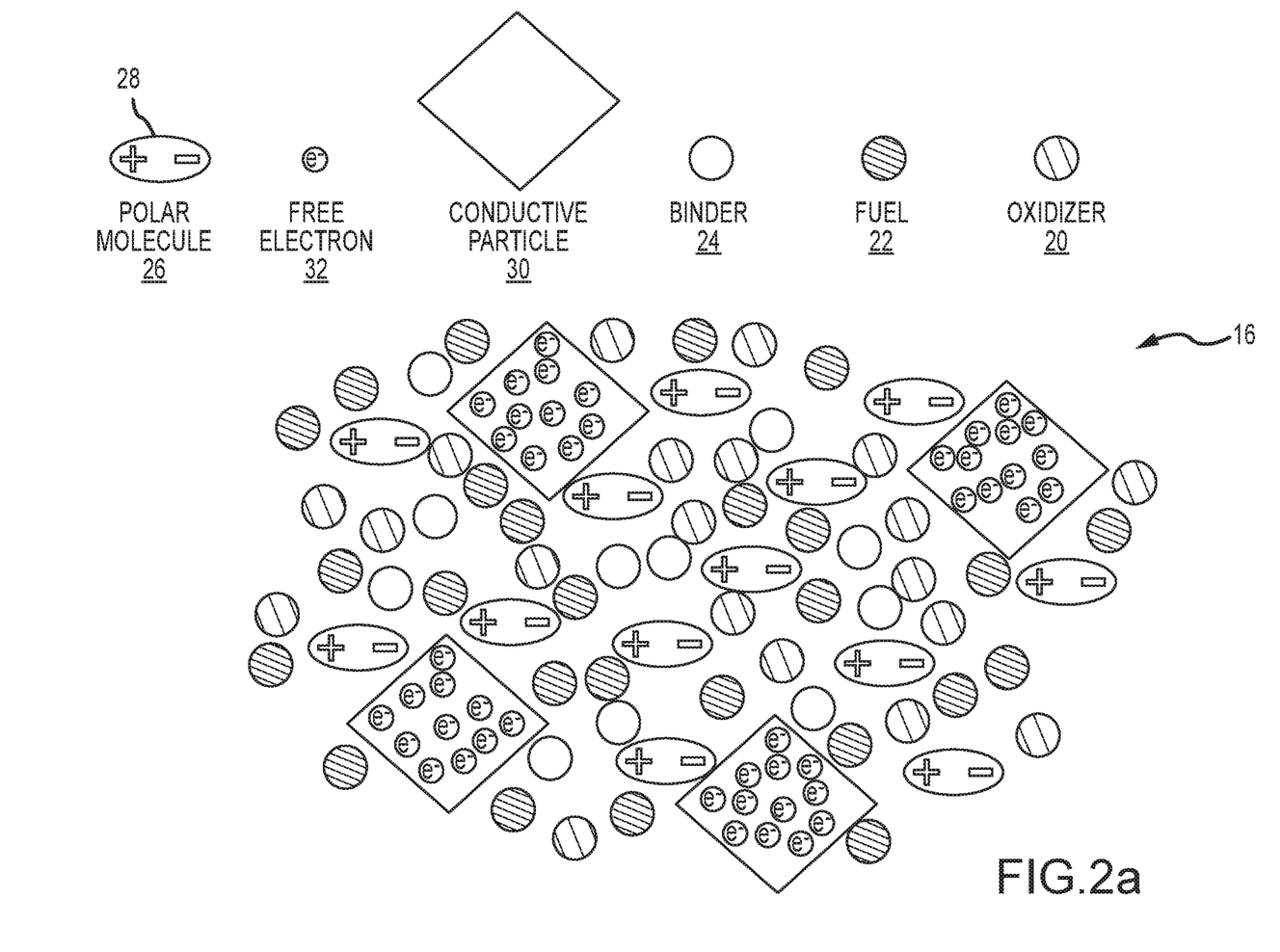
FIGS. 2a and 2b are illustrations of an electrically operated propellant with polar molecule and conductive particle additives and microwave stimulation of the propellant to produce dielectric heating and dielectric breakdowns to ignite an ignition surface.
Figure 2B:
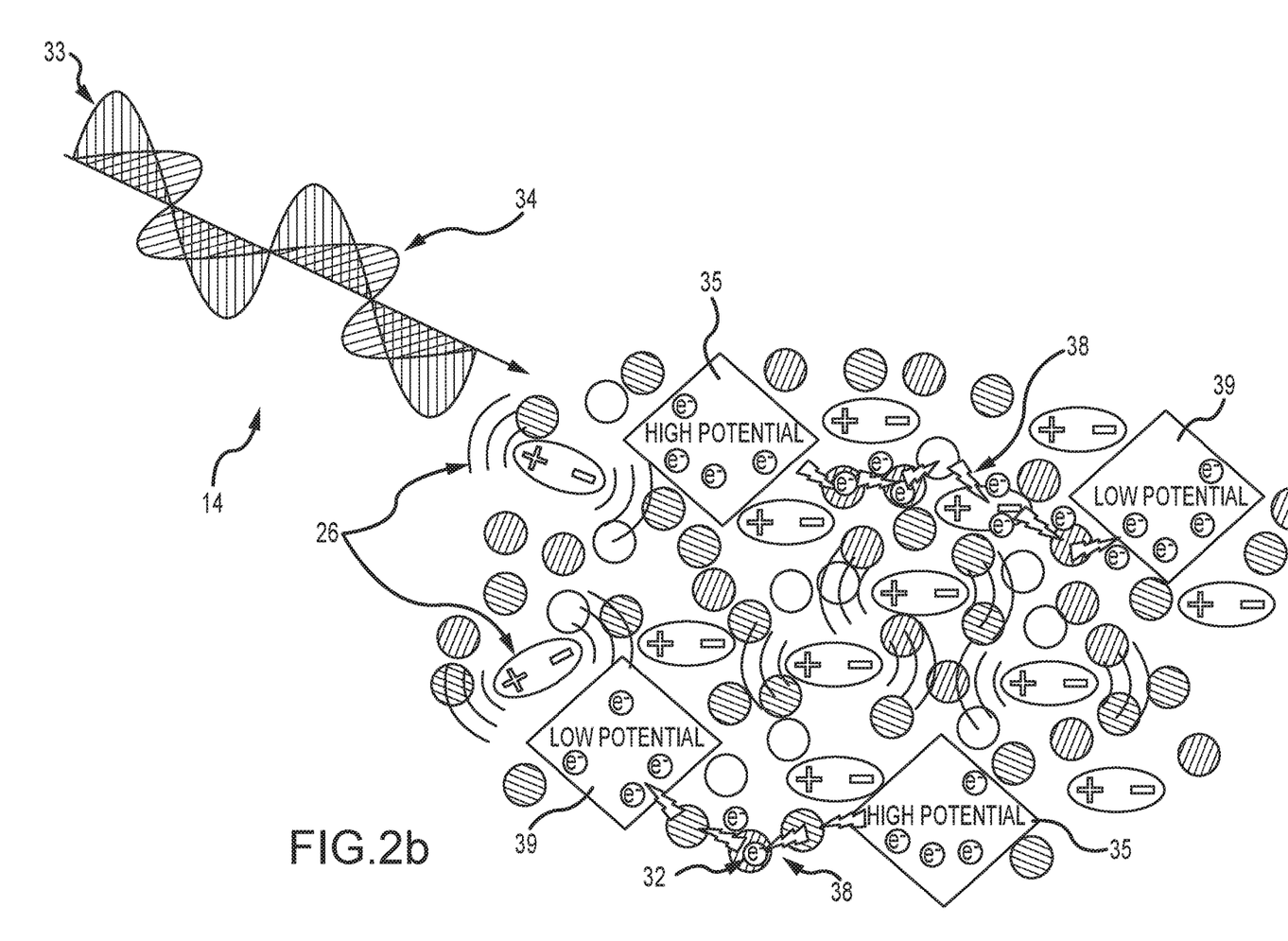

Referring now to FIGS. 1, 2a and 2b, a gas generation system 10 includes a source 12 (e.g. a magnetron) configured to generate microwave energy 14 in a defined microwave band between 0.3 GHz and 300 GHz, a mass of electrically operated propellant 16 and a combustion chamber 18. Typically, the walls of the chamber around the mass of propellant are impermeable to the microwave energy and the far wall opposite the mass is permeable to the microwave energy. The microwave band is generally a narrow band above a center frequency Fc. The band is typically at most +/−10% of Fc and more typically +/−5% of Fc. In certain embodiments, Fc lies between 1 and 10 GHz.

The electrically operated propellant 16 may be any formulation of constituent elements in which an ignition condition of the propellant is defined by satisfying both a thermal ignition threshold and an electrical ignition threshold. To ignite the propellant, the temperature of the propellant must exceed the thermal ignition threshold and the current density J must exceed the electrical ignition threshold.

The base electrically operated propellant 16 includes a combination of constituent elements including an oxidizer 20, a fuel 22, and a binder 24. The oxidizer provides oxygen required to burn the fuel. The binder provides a structural material to bind the fuel and oxidizer. The binder itself is a fuel. Additional fuel may or may not be required. The additional fuel may be a metal-based fuel such as aluminum magnesium or a polymer-based fuel such as Polyvinyl alcohol (PVA) and Polyvinylidene fluoride (Kynar).

To facilitate microwave ignition, the base electrically operated propellant is modified to reduce the amount of microwave energy required to satisfy both the thermal and electrical ignition conditions. Without such modification to the formulation, microwave ignition while theoretically possible would be impracticable.

The base electrically operated propellant may often include an additive containing polar molecules such as $H_2O$, glycerol, dimethul sulfoxide (DMSO), n-butanol, ethanolamine or 2-ethoxyethanol to mix the constituent elements of the propellant. The polar molecules are then removed during the baking process. This process may be modified by either increasing the original concentration of the polar molecules or changing the baking process such that a concentration of polar molecules 26 remain suspended in the final cured electrically operated propellant. For example, the polar molecule additive may constitute approximately 5 to 40 percent of the mass of the cured electrically operated propellant.

A polar molecule has a net polarity 28 as a result of the opposing charges (i.e. having partial positive and partial negative charges) from polar bonds arranged asymmetrically. Water ($H_2O$) is an example of a polar molecule since it has a slight positive charge on one side and a slight negative charge on the other. The dipoles do not cancel out resulting in a net polarity. If the bond dipole moments of the molecule do not cancel, the molecule is polar. For example, the water molecule ($H_2O$) contains two polar O—H bonds in a bent (nonlinear) geometry. The bond dipole moments do not cancel, so that the molecule forms a molecular dipole with its negative pole at the oxygen and its positive pole midway between the two hydrogen atoms.

The base electrically operated propellant may include conductive particles in the form of the metal-based fuel. Alternately, one or more additives including conductive particles 30 (e.g., metals such as tungsten, magnesium, aluminum . . . or non-metals such as graphene or carbon nanotubes) may be suspended within the propellant. The conductive particles increase the conductivity of the propellant by acting as a free source of electrons 32. The fuel may comprise a metal fuel such as aluminum or magnesium selected for their IR emittance or heat absorbance properties. The additive may be, for example, gold or tungsten selected for their electrical properties to provide free electrons. The non-fuel additives typically have higher conductivity and provide more free electrons. The conductive additive may constitute approximately 5 to 40 percent of the mass of the electrically operated propellant.

As shown in FIG. 2b, in an ignition condition, incoming microwave energy 14 includes both a magnetic field B 33 an electric field E 34 within an attenuation zone 36 of the propellant that oscillate at the microwave frequency. The electric field E 34 penetrates an attenuation zone 36. The remaining bulk 37 of the propellant is a region of little to no absorption. The electric field E causes the free electrons 32 to accumulate at conductive particles 30 of high potential 35 and be discharged in the form of dielectric breakdowns through the other constituents of the propellant to conductive particles 30 of low potential 39. The charge follows a path of least resistance between conductive particles. These discharges form randomly oriented local currents 38 that exhibit local current densities J that exceed an electrical ignition threshold. The net bulk current across the attenuation zone will be near zero. The randomness of the local discharges largely cancels. There might be a small bias current from the front to the back of the attenuation zone on account of a natural gradient in the amount of energy coupled to the material. Because signal attenuation (absorption) is a percentage of the available microwave power, the signal gets absorbed most rapidly at the front surface.

The electric field E also causes the polar molecules 26 to vibrate rapidly (the net polarity 28 tries to switch with the electric field E but cannot move fast enough), which produces dielectric heating to raise the temperature of the propellant above a thermal ignition threshold in the attenuation zone. Ignition typically occurs around 200 C for most propellants.

In this ignition condition, an ignition surface 40 of the attenuation zone ignites and burns as the zone regresses without igniting the remaining bulk of the propellant to generate gaseous byproducts 42 that pressurize a combustion chamber. The dielectric heating and dielectric breakdowns occur throughout the attenuation zone but most strongly at the ignition surface 40 because of signal attenuation causing it to ignite first. The thermal and electrical ignition thresholds may be satisfied throughout the attenuation zone but need only be satisfied at the ignition surface. The burn rate and regression of the burning propellant means that only the surface will burn as the propellant regresses. Burn back should not be a problem.

In different embodiments, to satisfy both the thermal ignition threshold and the electrical ignition threshold the polar molecules and conductive particles each constitute at least 5% of the mass of the electrically operated propellant. Furthermore, the additives and their relative concentrations are typically selected so that at least 5% of the microwave energy coupled to the propellant is absorbed by the polar molecules for dielectric heating and discharged in dielectric breakdowns. More typically, 70-90% of the energy is directed to dielectric heating and 10-30% to dielectric breakdowns.

In an embodiment, the electrically operated propellant 16 is formulated to exhibit a self-sustaining threshold pressure at which the propellant once ignited cannot be extinguished and below which the propellant can be extinguished by interruption of an electrical input. Sawka's hydroxyl-ammonium nitrate (HAN) based propellant (U.S. Pat. No. 8,857,338) exhibits a threshold of about 150 psi. Villarreal's perchlorate-based propellant (U.S. Pat. No. 8,950,329) can be configured to exhibit a threshold greater than 200, 500, 1,500 and 2,000 psi. In an extinguishment condition, combustion of the propellant is turned off by interrupting of the microwave energy as long as the chamber pressure has not exceeded this threshold.

In an embodiment, the electrically operated propellant 16 comprises an oxidizer such as an ionic perchlorate-based oxidizer of approximately 50 to 90 percent of the mass of the electrically operated propellant, a binder of approximately 10 to 30 percent of the mass of the electrically operated propellant, a metal or polymer based fuel of approximately 5 to 30 percent of the mass of the electrically operated propellant, a metal additive of approximately 5 to 40 percent of the mass of the electrically operated propellant, said metal additive acting as a free source of electrons to increase the conductivity of the propellant and a polar molecule additive of approximately 5 to 40 percent of the mass of the electrically operated propellant. The electrically operated propellant is configured to ignite and extinguish according to the respective application and interruption of microwave energy. The electrically operated propellant has a self-sustaining threshold pressure at which pressure the propellant once ignited cannot be extinguished and below which the propellant can be extinguished by interruption of the microwave energy.

Referring now to FIGS. 3a-3b and 4a-4b, a penetration depth 50 of an attenuation zone 52 in a propellant 54 is by convention defined as the depth at which $1/e^2$ ($\cong 13\%$), where e is base of the natural log, of a signal energy 56 at center frequency Fc from a source 58 remains assuming an anti-node (peak) 60 is positioned at an ignition surface 62. These peaks of amplitude, called anti-nodes, are the points at which energy is transferred into the propellant most rapidly. The desired penetration depth 50 may depend on such factors as the grain size of the propellant, the size of a rocket motor engine, thrust requirements. The penetration depth 50 may vary as the propellant regresses to accommodate initial ignition conditions versus ongoing burn or changing thrust requirements. A remaining bulk 64 of the propellant is a region of little to no absorption.

Figure 4A:
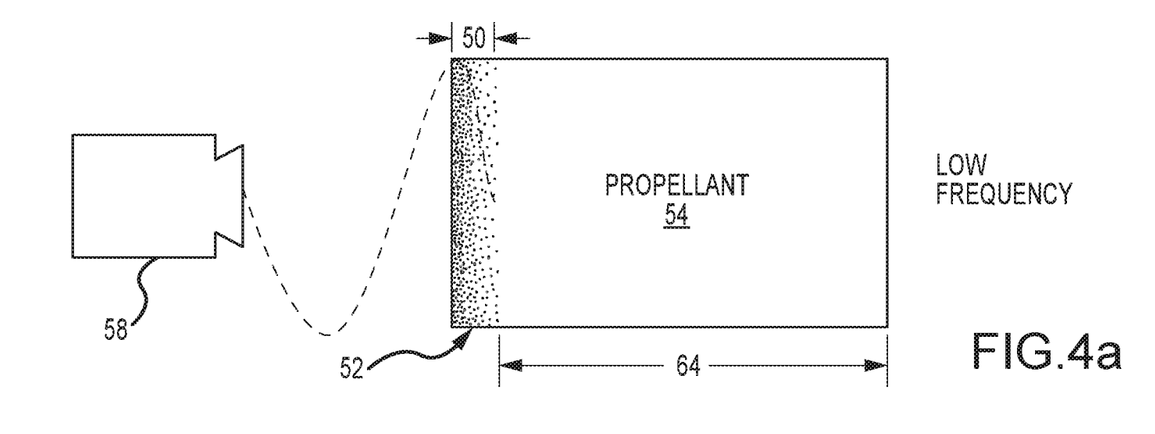
FIGS. 4a and 4b are illustrations of the gas generation system with varying depths of the attenuation zone in the electrically operated propellant based on the operating frequency of the microwave energy.
Figure 4B:
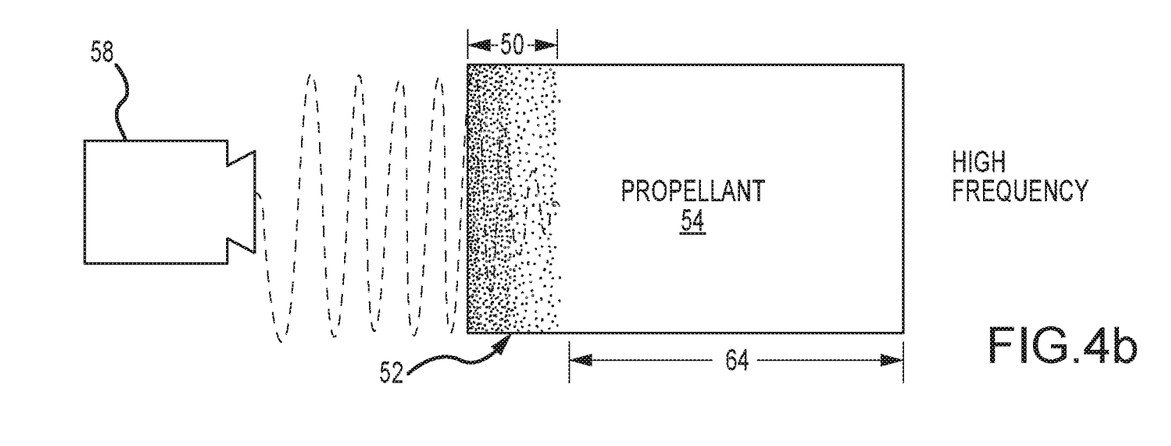

In general, the penetration depth is a function of the nature and concentration of the polar molecules and conductive additive and the microwave frequency Fc. As shown in FIGS. 3a-3b, the more absorbing or the greater the concentration of either additive the shallower the penetration depth 50. The concentration may be varied throughout the propellant to change the depth of the attenuation zone as the propellant burns and regresses. As shown in FIGS. 4a-4b, the lower the frequency (longer the wavelength) the shallower the penetration depth 50. The frequency may be varied to change the depth of the attenuation zone as the propellant burns and regresses.

Figure 5:
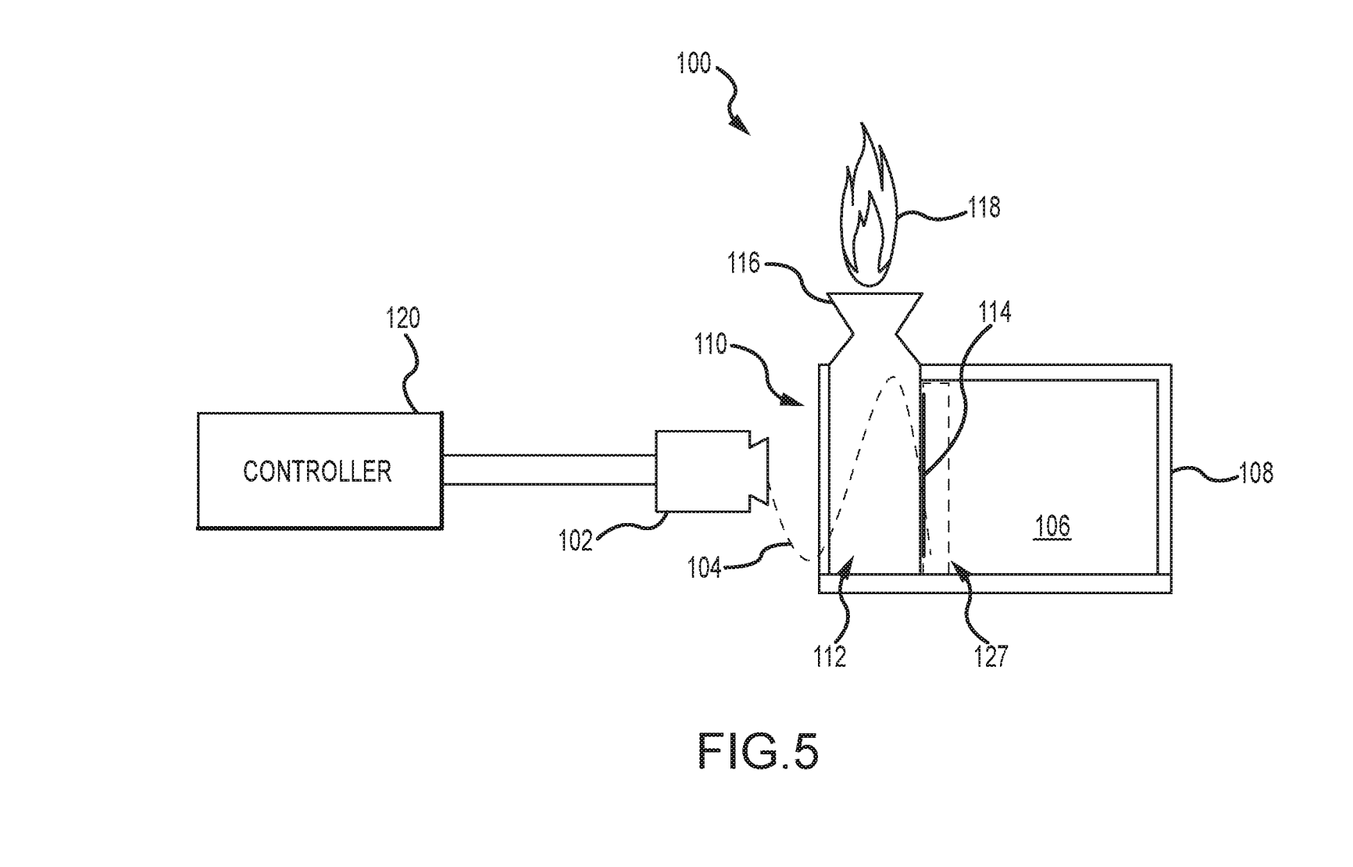
FIG. 5 is an illustration of an embodiment of a rocket motor using microwave ignition of an electrically operated propellant.
Figure 6:
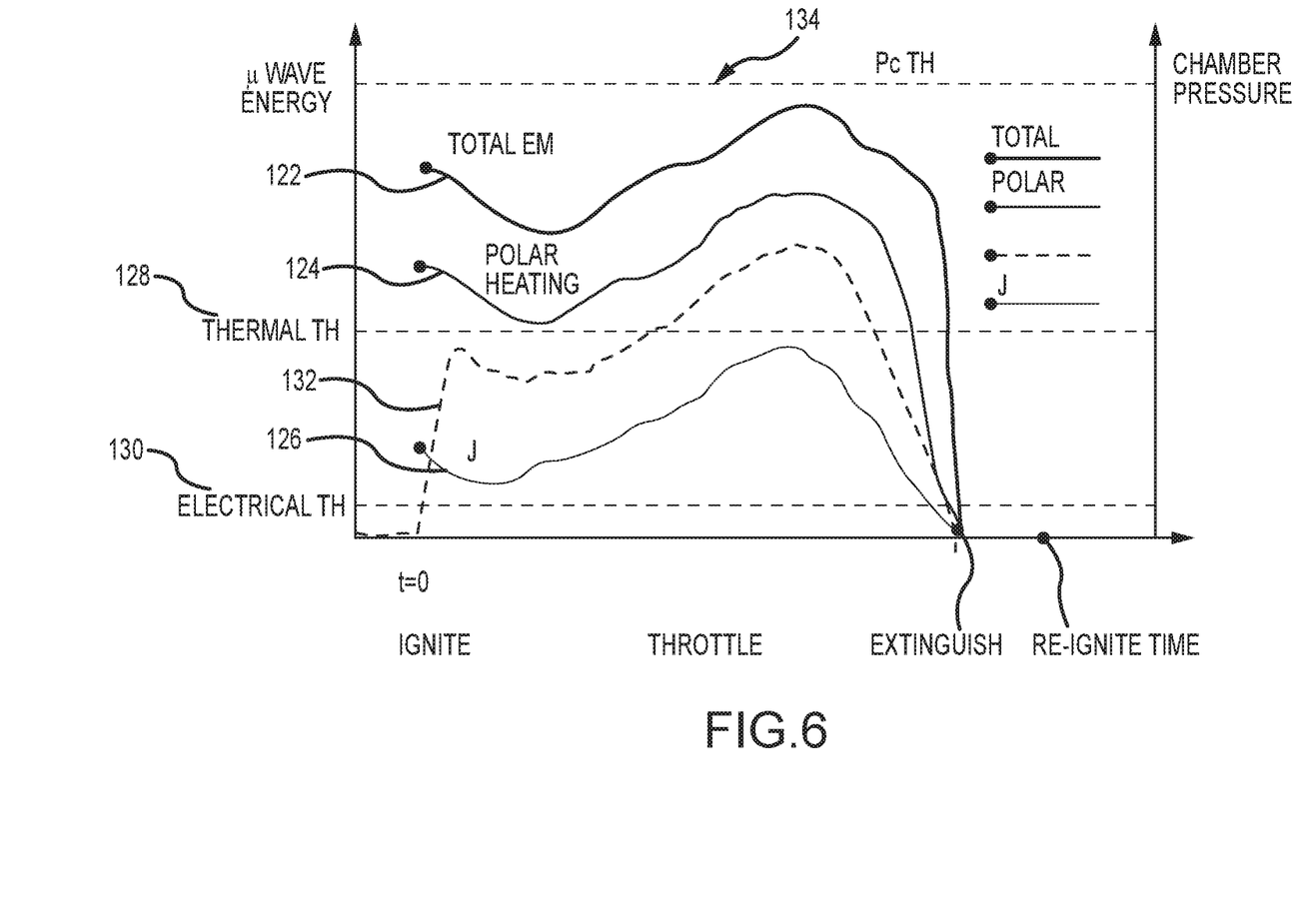
FIG. 6 is a diagram illustrating the ignition, throttling and extinguishing of the electrically operated propellant by the microwave source.

Referring now to FIGS. 5 and 6, an embodiment of a rocket motor 100 includes a source 102 (e.g. a magnetron) configured to generate microwave energy 104 in a defined microwave band between 0.3 GHz and 300 GHz. A mass of electrically operated propellant 106 is contained in a microwave impermeable case 108. A microwave permeable wall 110 defines a combustion chamber 112 to which a surface 114 of the propellant is exposed. A nozzle 116 is coupled to the combustion chamber to exhaust high-pressure gas 118 to produce thrust. A controller 120 is configured to control source 102 to set and possibly vary the amplitude and frequency of microwave energy 104 to control the burn rate, hence the thrust.

In an ignition condition, controller 120 configures source 102 to generate microwave energy 104 at a frequency Fc and of sufficient amplitude 122 such that the polar heating component 124 and local current density J component 126 in an attenuation zone 127 exceed their respective thermal ignition threshold 128 and electrical ignition threshold 130 at surface 114 to ignite and burn the surface. Burning of the propellant produces the high-pressure gas 118 at a chamber pressure Pc 132.

In a throttle condition, controller 120 may throttle the burn rate, hence chamber pressure 132 and the resulting thrust up and down based on mission requirements. This would typically be done by varying the amplitude 122 of the of the microwave energy. Alternately, the controller may alter the frequency or phase of the microwave energy to vary the amount of energy coupled to the propellant.

In an extinguishment condition, provided the chamber pressure Pc 132 has not exceeded a self-sustaining threshold pressure 134 of the electronically operated propellant, the controller 120 may extinguish combustion of the propellant by interrupting the microwave energy. The controller may re-ignite the propellant by satisfying the ignition condition.

As long as the self-sustaining threshold pressure 134 is not exceeded, the controller 120 can turn the ignition of the propellant on and off at will. When combined with the high self-sustaining threshold pressures provided by Villareal's formulation, the controller has the flexibility to deliver a dynamic and controllable thrust profile such as might be used to control the motion and displacement of a vehicle or the rate and duration of the inflation of an automotive airbag.

As previously discussed, the peaks of amplitude of the microwave energy, called anti-nodes, are the points at which the microwave energy is transferred into the propellant most rapidly. As such, it is generally desirable to position the anti-node at the ignition surface at ignition and maintain that position as the propellant burns. For conciseness, the reference numbers used in FIG. 5 are used here for like elements.

Figure 7A:
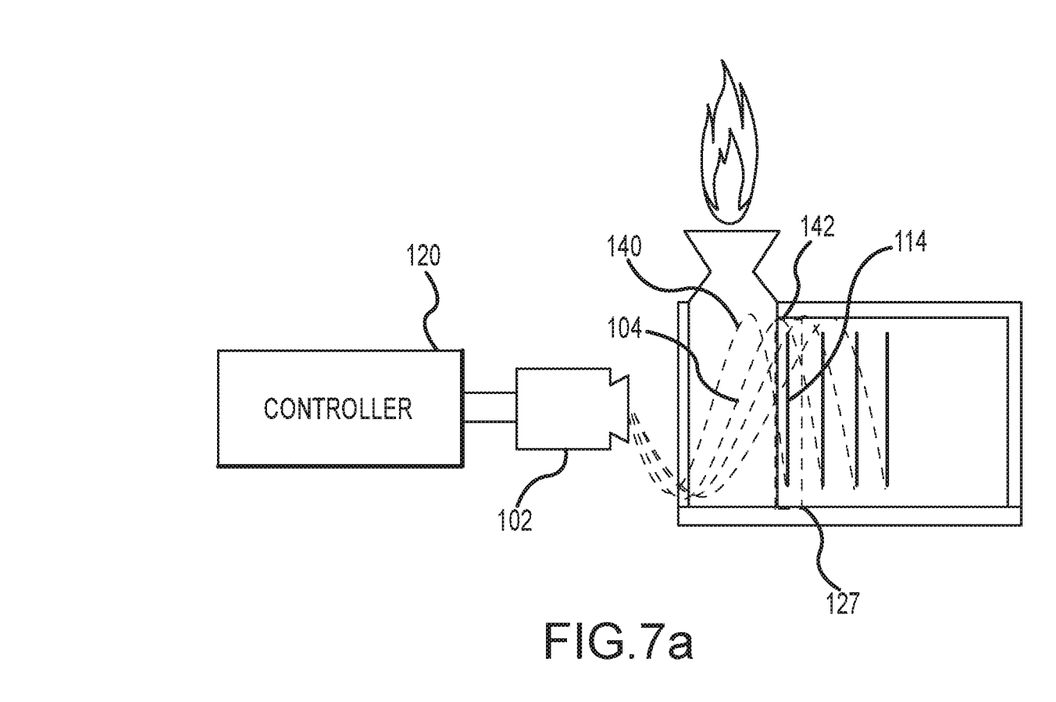
FIGS. 7a and 7b are embodiments of a phase-controlled microwave source and a linear actuator for the electrically operated propellant to position the anti-node of the microwave energy at the ignition surface of the electrically operated propellant.
Figure 7B:
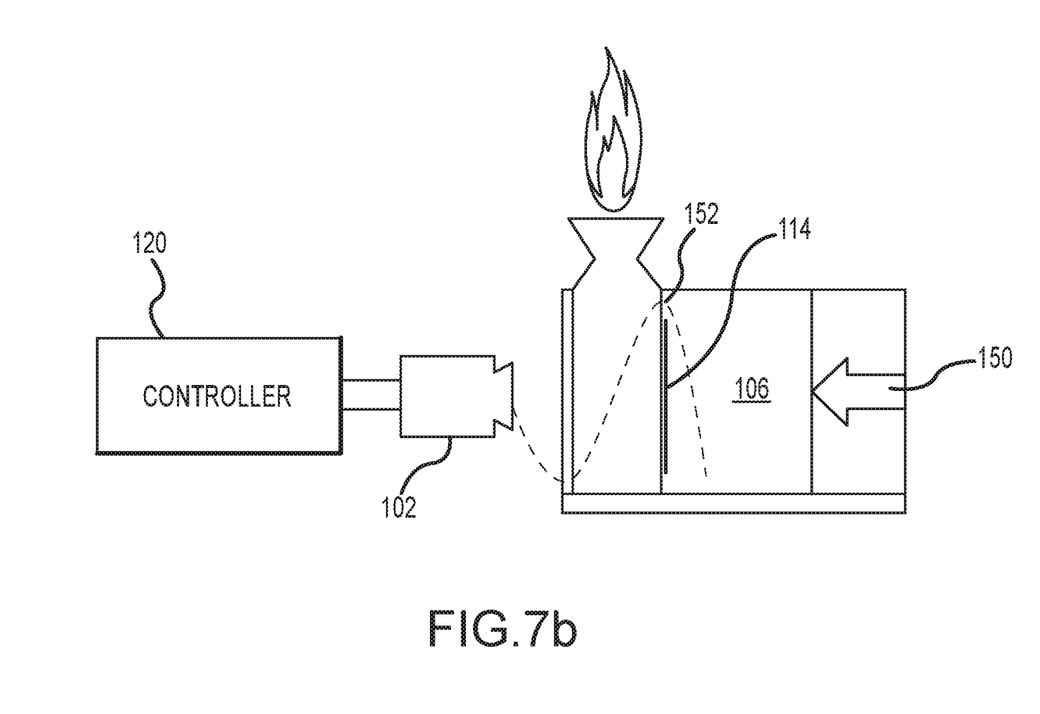

Referring now to FIG. 7a, in an embodiment, controller 120 modulates the phase 140 (or frequency) of the microwave energy 104 is modulated such that an anti-node 142 tracks the position of the ignition surface 114 as the attenuation zone 127, hence surface 114 regresses. This can be done open-loop based on a priori knowledge of the burn rate and regression of the propellant or closed-loop using a sensor to detect the position of surface 114 or rate of regression Referring now to FIG. 7b, in an embodiment, an actuator 150 displaces the propellant 106 to hold the ignition surface 114 in place at a fixed anti-node 152 of the microwave energy. The actuator may comprise one or more springs, a linear actuator, a screw drive, hydraulic pistons or high-pressure gas and valves. The high-pressure gas in the chamber may be partially diverted behind the propellant to assist the actuator.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A gas generation system, comprising:
a combustion chamber;
a source configured to generate microwave energy in a defined microwave band between 0.3 GHz and 300 GHz and to provide said microwave energy as an electrical input; and
an electrically operated propellant in which an ignition condition of the electrically operated propellant is defined by satisfying both a thermal ignition threshold and an electrical ignition threshold, wherein said electrically operated propellant has a self-sustaining threshold pressure at which the electrically operated propellant once ignited cannot be extinguished and below which the electrically operated propellant can be extinguished by interruption of the electrical input in an extinguishment condition, said electrically operated propellant further including,
one or more conductive additives including conductive particles suspended within the electrically operated propellant that increase a conductivity of the electrically operated propellant; and
one or more polar additives including polar molecules suspended within the electrically operated propellant,
wherein the one or more conductive additives and the one or more polar additives reduce an amount of the microwave energy otherwise required to satisfy the ignition condition and to sustain combustion of the electrically operated propellant, and
a controller configured to control the source such that in the ignition condition, the microwave energy accumulates electric charge in the electrically operated propellant in an attenuation zone, with said electric charge being discharged in the form of dielectric breakdowns between the conductive particles through the electrically operated propellant such that a local current density J surpasses the electrical ignition threshold, and wherein in the ignition condition, the microwave energy also rapidly vibrates the polar molecules to increase a temperature of the electrically operated propellant in the attenuation zone to surpass the thermal ignition threshold, whereby the controller controls the source such that the electrical ignition threshold and the thermal ignition threshold are met only at an ignition surface of the attenuation zone whereby only the ignition surface is ignited without igniting a remaining bulk of the electrically operated propellant, to thereby generate gaseous byproducts that pressurize the combustion chamber while maintaining a combustion chamber pressure of the combustion chamber at less than the self-sustaining threshold pressure,
wherein the controller is further configured to control the source to vary a phase or frequency of the microwave energy such that an anti-node of the microwave energy tracks the ignition surface as the attenuation zone regresses,
wherein in the extinguishment condition the source interrupts generation of the microwave energy to interrupt the electrical input and extinguish the electrically operated propellant.

2. The gas generation system of claim 1, wherein the defined microwave band is a center frequency Fc between 0.3 GHz and 300 GHz plus or minus at most 10% of the center frequency.

3. The gas generation system of claim 2, wherein the center frequency Fc is between 1 and 10 GHz.

4. The gas generation system of claim 1, wherein the conductive particles include metal particles that provide fuel for the electrically operated propellant.

5. The gas generation system of claim 1, wherein said conductive particles constitutes at least 5% by mass of the electrically operated propellant and said polar molecules constitute at least 5% by mass of the electrically operated propellant.

6. The gas generation system of claim 1, wherein said one or more conductive additives and said one or more polar additives are configured such that at least 5% of the microwave energy coupled into the electrically operated propellant is discharged in dielectric breakdowns and at least 5% is absorbed by the polar molecules to satisfy the electrical ignition threshold and the thermal ignition threshold, respectively.

7. The gas generation system of claim 1, wherein a depth of the attenuation zone varies as the attenuation zone regresses.

8. The gas generation system of claim 1, further comprising a nozzle coupled to the combustion chamber to exhaust the gaseous byproducts to produce thrust.

9. The gas generation system of claim 1, wherein said self-sustaining threshold pressure is at least 500 psi.

10. The gas generation system of claim 9, wherein the electrically operated propellant comprises:
50 to 90 percent by mass an ionic perchlorate-based oxidizer;
10 to 30 percent by mass a binder;
5 to 30 percent by mass a metal or polymer based fuel;
5 to 40 percent by mass a metal additive; and
5 to 40 percent by mass the polar molecules.

11. The gas generation system of claim 1, wherein the ignition surface burns as the attenuation zone regresses.

12. The gas generation system of claim 1, wherein the conductive particles provide a free source of electrons for the dielectric breakdowns.

13. A method of generating a gaseous byproduct to pressurize a combustion chamber, the method comprising:
providing an electrically operated propellant in which an ignition condition of the electrically operated propellant is defined by satisfying both a thermal ignition threshold and an electrical ignition threshold, said electrically operated propellant having a self-sustaining threshold pressure of at least 200 psi at which the electrically operated propellant once ignited cannot be extinguished and below which the electrically operated propellant can be extinguished by interruption of the an electrical input, said electrically operated propellant including metal particles and polar molecules suspended within the electrically operated propellant to reduce an amount of energy supplied by the electrical input required to satisfy the ignition condition;
supplying microwave energy as the electrical input to the electrically operated propellant to rapidly vibrate the polar molecules to increase a temperature of the electrically operated propellant above the thermal ignition threshold;
supplying the microwave energy as the electrical input to the electrically operated propellant to accumulate and then discharge electric charge in the form of dielectric breakdowns into randomly oriented local currents that exhibit a local current density J above the electrical ignition threshold thereby satisfying the ignition condition thereby igniting and sustaining ignition of an ignition surface as the electrically operated propellant burns, wherein the metal particles and polar molecules reduce the an amount of the microwave energy otherwise required to satisfy the ignition condition and to sustain the burning of the electrically operated propellant;

wherein combustion of the ignited electrically operated propellant generates the gaseous byproduct that pressurizes the combustion chamber; and varying a phase or frequency of the microwave energy such that an anti-node of the microwave energy tracks the ignition surface as the attenuation zone regresses; and extinguishing the electrically operated propellant by interrupting the microwave energy while the electrically operated propellant is subject to a pressure less than the self-sustaining threshold pressure.

14. The method of claim 13, wherein the self-sustaining threshold pressure is at least 500 psi, wherein the electrically operated propellant comprises a perchlorate based oxidizer.

* * * * *